United States Patent [19]

Mori

[11] Patent Number: 4,951,235

[45] Date of Patent: Aug. 21, 1990

[54] OPTION UNIT DETECTING APPARATUS FOR ELECTRONIC EQUIPMENT

[75] Inventor: Isao Mori, Nagoya, Japan

[73] Assignee: Brother Kogyo Kabushiki Kaisha, Aichi, Japan

[21] Appl. No.: 340,453

[22] Filed: Apr. 19, 1989

[30] Foreign Application Priority Data

Apr. 20, 1988 [JP] Japan .................................. 63-98966

[51] Int. Cl.⁵ .............................................. G06F 3/00
[52] U.S. Cl. ..................................................... 364/550
[58] Field of Search ................ 364/550; 307/112, 134; 328/142, 150, 152

[56] References Cited

U.S. PATENT DOCUMENTS 4,156,931 5/1979 Adelman et al. .................... 364/900

Primary Examiner—Parshotam S. Lall
Assistant Examiner—Michael Zanelli
Attorney, Agent, or Firm—Oliff & Berridge

[57] ABSTRACT

An option unit detecting apparatus detects whether an option unit is connected to or disconnected from an electronic equipment. The electronic equipment includes an electronic circuit having an input/output port, and the option unit includes at least one semiconductor device. When the option unit is disconnected from the electronic unit, a switching element is rendered ON and a low-level signal is applied to the input/output port of the electronic circuit. When the option unit is connected thereto, the switching element is rendered OFF and a high-level signal is applied thereto. Accordingly, it is possible to detect whether the option unit is connected to or disconnected from the electronic unit based upon the level of the signal applied to the input/output port.

5 Claims, 5 Drawing Sheets

OPTION UNIT DETECTING APPARATUS FOR ELECTRONIC EQUIPMENT

BACKGROUND OF THE INVENTION

The present invention relates to an option unit detecting apparatus for an electronic equipment, and more particularly, to an apparatus for detecting a connecting status of an option unit to an electronic equipment by rendering a switching element provided in an electronic equipment operative or inoperative depending on whether or not a current can be supplied to a semiconductor device provided in the option unit.

In general, an electronic equipment, such as a personal computer or an electronic typewriter, is coupled to option units, such as a floppy disk drive or an auto cut-sheet feeder (hereinafter referred to as ACF). so as to permit desired data to be printed on a printing sheet or stored into a storage medium, or permit a printing sheet to be automatically fed. In the electronic typewriter, for example, the connection status of an option unit, such as ACF, is detected to eliminate an operational inconvenience. As shown in FIG. 7, a CPU 32 provided in a controller 31 of connector 39 and has another port P5 coupled through an option-unit detecting signal line 37 to a terminal 42 of the connector 39. A reference voltage terminal E1 is coupled through a power line 35 to a terminal 40 of the connector 39 which has a terminal 43 connected to ground through a ground line 38. The option-unit detecting signal line 37 is coupled through a pull-up resistor R8 to the reference voltage terminal E1, and the drive signal line 36 is also coupled through a pull-up resistor R9 to this terminal E1.

Tho control system of an ACF 50 is provided with at least a connector 44, a solenoid 49 for driving an engagement pawl to drive a feed roller for automatic sheer feeding, and an NPN transistor Tr4 for energizing the solenoid 49. A terminal 45 associated with the terminal 40 is coupled to the one end of the solenoid 49, a terminal 46 associated with the terminal 41 is coupled to the base of the transistor Tr4, and terminals 47 and 4B associated respectively with the terminal 42 and 43 are coupled to the emitter of the transistor Tr4.

When the ACF 50 is not coupled to the typewriter 30, a high-level signal is impressed on the port P5 due to the connection to the reference voltage +V, whereas when the ACF 50 is coupled to the typewriter 30, the option-unit detecting signal line 37 is coupled to the ground line 38 through the terminals 42, 47, 48 and 43, and the port P5 is applied with a low-level signal. Accordingly, the presence or absence of the ACF 50 can be detected from the signal level at the port P5.

As described, in order to detect coupling of an option unit 50 to an electronic equipment, four cable lines are required; power line 35, drive signal line 36, option-unit detecting signal line 3?, and ground line 3B. with longer connection cable lines for coupling the typewriter 30 to ACF 50, the manufacturing cost would be increased due to the necessity for separately providing the signal line 37 for detecting the connection status of an option unit. Further, noise is more likely to be generated by an electric wave radiated from the connection cable lines, and the connector 39 would be enlarged in size to thus increase the cost of the cable due to the necessity for separately providing the terminal 42 for the signal line 37 to the connector 39.

SUMMARY OF THE INVENTION

It is an object of this invention to provide an option unit detecting apparatus for an electronic equipment, which can detect whether an option unit is connected to or disconnected from the electronic equipment with a reduced number of cable lines and without need for separately providing an option-unit detecting signal line.

According to the present invention, as shown in FIG. 1, there is provided an option unit detecting apparatus for detecting a connection of an option unit to an electronic equipment, the option unit being connectable to or disconnectable from the electronic equipment wherein when the option unit is connected thereto, a current is flowed in the optional unit from the electronic equipment and when the option unit is disconnected therefrom, the current flow is interrupted, the electronic equipment including an electronic circuit having an input/output port, the option unit having at least one semiconductor device, the apparatus comprising:

a reference voltage source for supplying a reference voltage, the reference voltage source being coupled to the input/output port for applying a reference voltage thereto;

a switching means having an input terminal and an output terminal coupled to the reference voltage source, the switching means being selectively enabled in response to an enabling signal applied to the input terminal or disabled in response to a disabling signal applied to the input terminal, wherein the reference voltage is applied to the input/output port when the switching means is disabled and application of the reference voltage to the input/output port is interrupted when the switching means is enabled; and a driving means coupled to the switching means for applying the enabling signal to the input terminal when the current flow is interrupted and the disabling signal to the input terminal then the current is flowed in the semiconductor device, whereby whether or not the option unit is connected to the electronic equipment can be detected depending upon whether or not the reference voltage is applied to the input/output port.

According to the option unit detecting apparatus of the present invention, when the current is not flowed in the option unit, i.e., when the option unit is disconnected from the electronic equipment, a switching means is enabled or rendered on by the driving means. In other words, when the switching means is on, the reference voltage or a high-level signal is not applied to the input/output port but a low-level signal is applied thereto. On the other hand, when the current is flowed to the option unit, i.e., when the option unit is connected to the electronic equipment, the switching means is disabled or rendered OFF by the driving means. In other words, when the switching means is OFF, the input/output port is applied with the reference voltage or the high-level signal. Accordingly, it is possible to detect whether the option unit is connected to or disconnected from the electronic unit based upon the level of the signal applied to the input/output port.

DETAILED DESCRIPTION OF THE PREFERRED EMBODIMENTS

With reference to the accompanying drawings, an embodiment of this invention as applied to an electronic typewriter will be described below.

Figure 1:
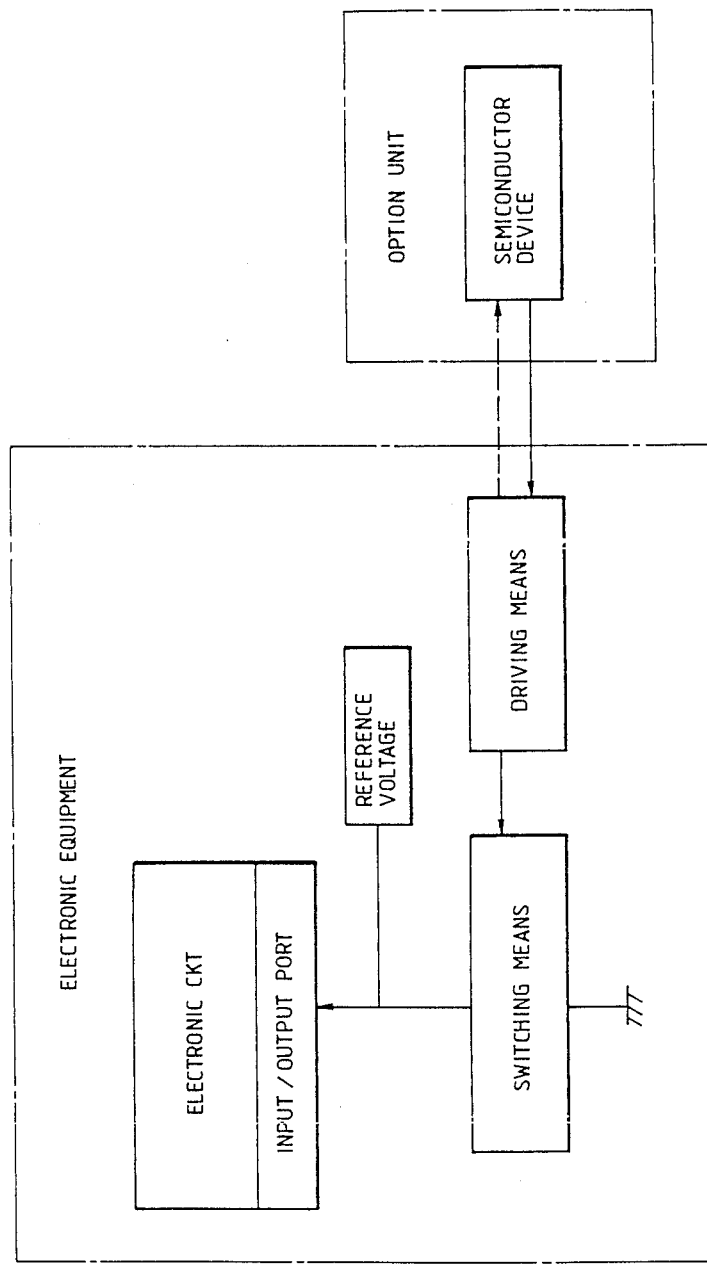
FIG. 1 is a block diagram functionally illustrating a principle of the present invention.
Figure 2:
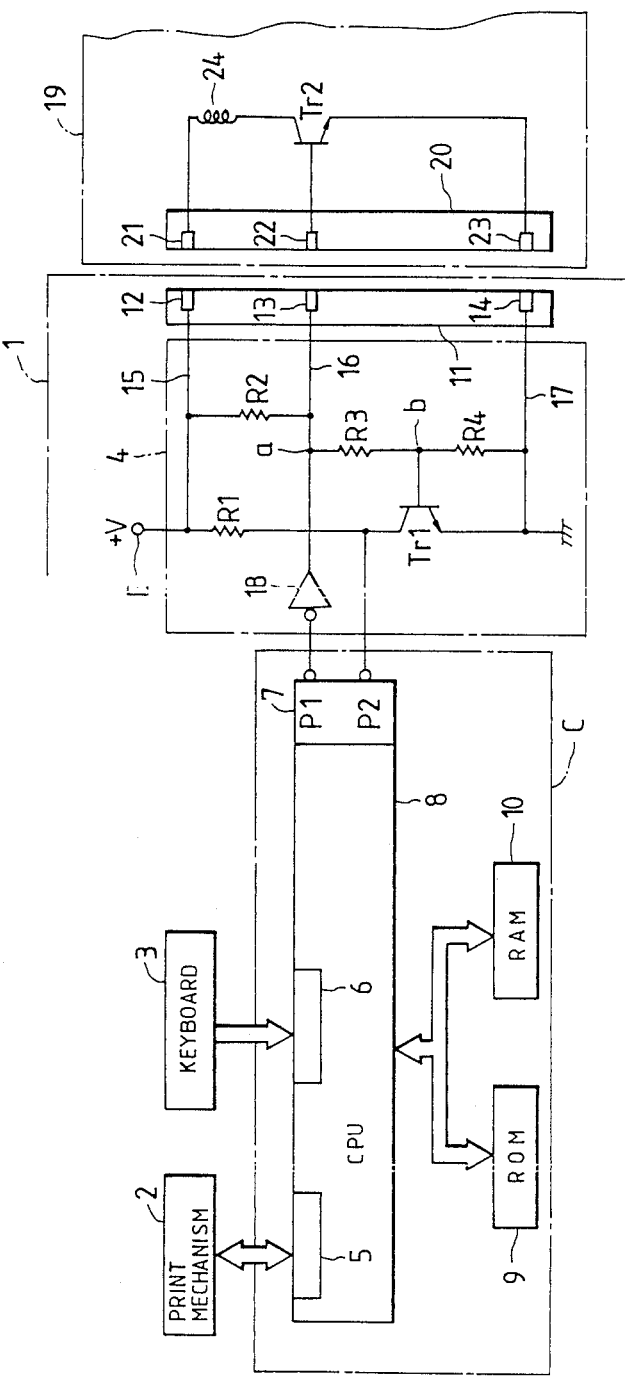
FIG. 2 is a block diagram showing a control system of a typewriter provided with an option detecting/driving circuit according to one embodiment of the present invention.

As shown in FIG. 2, a typewriter 1 comprises a print mechanism 2, a keyboard 3, a controller C and an option detecting/driving circuit 4. The print mechanism 2 includes a carriage driving mechanism for moving a printing head mounted carriage along a longitudinal direction of a platen, item drive motor, a driver for the motor, a sheet feeding mechanism for feeding a printing sheet, its drive motor, a driver for the latter motor, and a printing head driver. The keYboard 3 is provided with a variety of keys such as character keys including alphabet keys, numeric keys and a space keY, and function keys.

The controller C comprises a single chip CPU (Central Processing Unit) 8 having at least three I/0 ports 5, 6 and a ROM (Read Only Memory) 9 and a RAM (Random Access Memory) 10 both coupled to the CPU 8 via a data bus. The print mechanism 2 is coupled to the I/0 port 5, the keyboard 3 to the I/0 port 6, and the option detecting/driving circuit 4 to the 1/0 port 7. The ROM 9 stores a control program for controlling the print mechanism 2 in association with code data entered through the individual character keys and function keys on the keYboard 3, a control program for switching the mode of ports P1 and P2 of the I/0 port 7 to an input mode or an output mode, a control program for controlling detection of an option unit The RAM 10 is provided with various memories for temporarily storing results of computatiOn executed by the CPU 8.

Referring to FIG. 2, the option detecting/driving circuit 4 will be described.

A reference voltage terminal E applied with a DC reference voltage (for example, +5 V) is connected to a terminal 12 of a DIN connector via a power line 15. The port PI of the I/0 port 7 is coupled through an inverter 18 and a drive signal line 16 to a terminal I of the connector 11. A terminal 14 of the connector 11 is grounded through a ground line 17. A resistor R2 is connected between the power line 15 and the drive signal line 16, and resistors R3 and R4 are coupled in series to each other at a node b. The resistor R3 is further connected to a node a on the drive signal line 16, and the resistor R4 to the ground line 17. Further, an NpN transistor Tr1 (electronic switching element) is provided which has a base connected to the node b, a collector connected to both the port P2 of the I/0 port 7 and the reference voltage terminal E through a pull-up resistor R1, and an emitter connected to ground.

The control system of an ACF 19 serving as an option unit is provided with at least a connector 20 that is connectable to the connector 11, a solenoid 24 for driving an engagement pawl to drive a feed roller for automatic sheet feeding, and an NPN transistor Tr2 (semiconductor device) for driving the solenoid 24. A terminal 21 of the connector 20 associated with the terminal 12 is coupled to one end of the solenoid 24, a terminal 22 of the connector 20 associated with the terminal 13 is coupled to the base of the transistor Tr2, a terminals 23 of the connector 20 associated with the terminal 14 is coupled to the emitter of the transistor Tr2. The other end of the solenoid 24 is connected to the collector of the transistor Tr2. The resistance values of the resistors R3 and R4 are set so as to be sufficiently larger than the value of the resistor R2, and the value of the resistor R4 is set so as to be sufficiently larger than that of the resistor R3.

Figure 3:
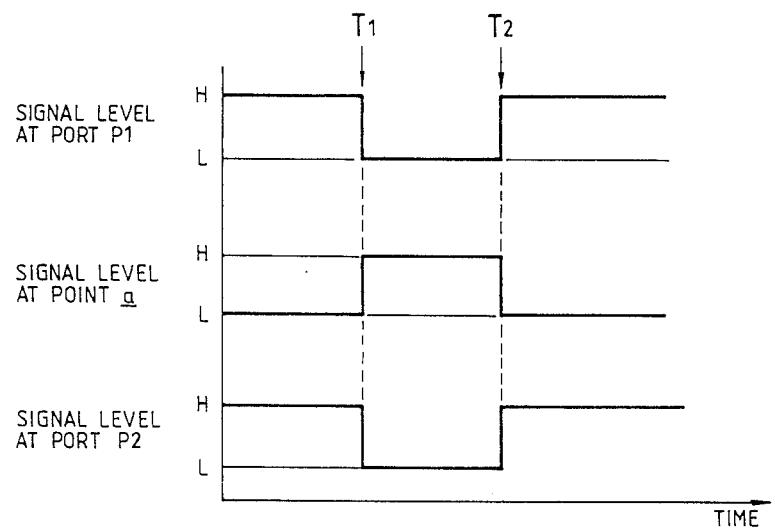
FIG. 3 is a timing chart for description of the operation of the embodiment shown in FIG. 2 in the case where an option unit is not coupled to the typewriter.
Figure 4:
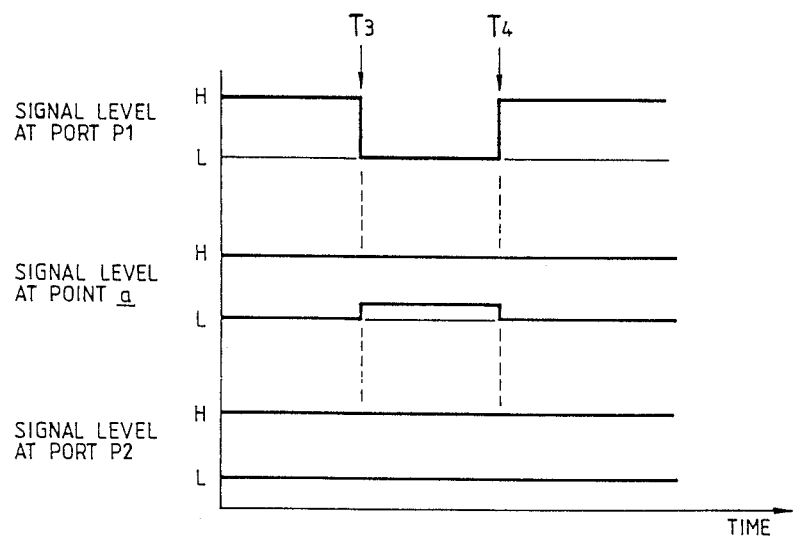
FIG. 4 is a timing chart for description of the operation of the embodiment shown in FIG. 2 in the case where the option unit is coupled to the typewriter.

Referring to FIGS. 2 to 4, description will be given below of the operation of the option detecting/driving circuit 4 for detecting whether or not the ACF 19 is coupled to the typewriter 1.

First, under the condition where the ACF 19 is disconnected from the typewriter 1, when a low-level signal is outputted from the port P1 at a time instant $T_1$, a highlevel signal appears at the node a on the drive signal line 16 (see FIGS. 2 and 3). Since the resistance of the resistor R4 is sufficiently larger than those of the resistors R2 and R3, a relatively large voltage is developed across the resistor R4. This voltage causes the base current of the transistor Tr1 to flow to thereby render the transistor Tr1 conductive. As a result, the port P2 is applied with a low-level signal, not the reference voltage. In other words, it is possible to detect the fact that the ACF 19 is not coupled to the typewriter 1 by detecting the low-level signal appearing at the port 2 when the low-level signal is outputted from the port P1. At the time instant $T_2$, a high-level signal is output from the port P1.

Then, under the condition where the ACF 19 is connected to the typewriter 1, when a low-level) signal is outputted from the port Pl at the tIme instant $T_3$, a high-level signal on the drive signal line 16 is applied to the base of the transistor Tr2 through the terminals 13 and 22, so that the base current of the transistor Tr2 flows, thereby rendering Tr2 conductive (see FIGS. 2 and 4). As a result, the voltage on the drive signal line 16 falls to a low level (for example, 0.7 V) equal to the voltage between the base and emitter of the transistor Tr2, so that the potential at the node b falls to a low level. This renders the transistor Tr1 non-conductive and the port P2 is applied with the reference voltage or the high-level signal. In other words, it is possible to detect the coupling of the ACF 19 to the typewriter by detecting the high-level signal appeared at the port 2 when the low-level signal is outputted from the port P!. At the time instant $T_4$, a high-level signal is outputted from the port Pl. It should be noted that the interval between the time instants $T_3$ and $T_4$ is set within about 100 microseconds in the duration of which the solenoid 24 is energized. The same is true with respect to the time interval between $T_1$ and $T_2$.

Figure 5:
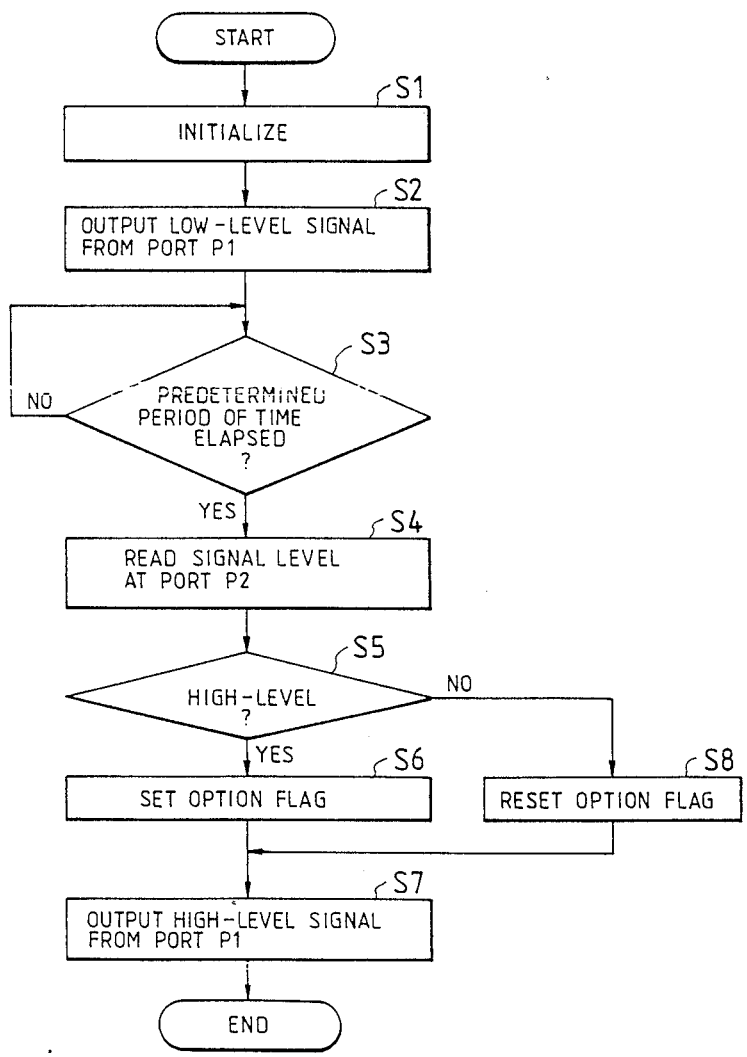
FIG. 5 is a flowchart of a routine for detection of the coupling of the option unit.

Description will now be given of the option unit detecting control executed by the controller C of the electronic typewriter 1 based on the flowchart shown in FIG. 5 while referring to FIGS. 3 and 4.

When the typewriter i is powered, this control starts and the flow advances to stop Si where the initialization is carried out. The port Pl of the I/0 port 7 is switched to the output mode so that the low-level signal is outputted from the port P1 (step 2), After a predetermined period of time has elapsed (for example, about 20 microseconds) during which time the transistor Tr1 or Tr2 is placed in an operable condition (step 3). the port P2 is switched to the input mode and the signal appeared at the port P2 is latched (step 4). The fact that a high-level signal appears at the port P2 (step 5) indicates that the ACF 19 has been coupled to the typewriter 1 as shown in FIG. 4. Then, an option flag provided within the RAM 10 is set (step 6). and a high-level signal is outputted from the port P1 (step 7). thus completing this control. On the other hand, the fact that a low-level signal appears at the port P2 (step 5) indicates that that the ACF 19 is not coupled to the typewriter i as shown in FIG. 3. Thus, the option flag is reset (step 8), and the processing at step 7 is executed, thereby completing this control.

As described above, an electronic component or an electronic circuit need not be supplementally provided in the ACF 19 or other kinds of an option unit. With the option detecting/driving circuit 4 simple in circuit arrangement is provided in the typewriter 1, it is possible ±o detect whether or not the ACF 19 is coupled to the typewriter 1 by detecting whether or not a current is supplied through the drive signal line 16 to the transistor Tr2 provided on part of the AOF 19. Accordingly, three connecting cable lines for coupling the typewriter I to the ACF 19, i.e. the power line 15, driver signal line 16 and ground line 17, would suffice to achieve the intended detection. An option unit detecting signal line needed in the conventional device can be dispensed with, so that it is possible to reduce the cost for producing connection cable lines, reduce noise caused by an electric wave radiated from the connection cable line, and reduce the number of terminals of the connectors 11 and 20.

Figure 6:
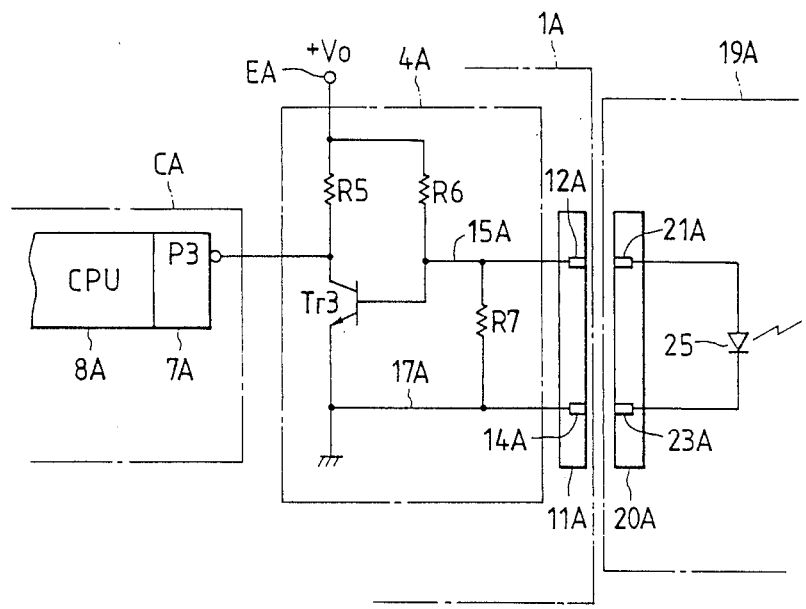
FIG. 6 is a diagram illustrating an option detecting/driving circuit according to another embodiment of the present invention.
Figure 7:
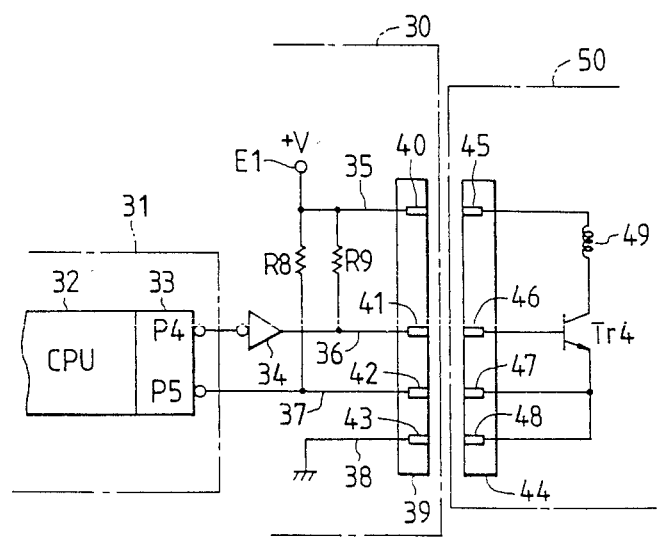
FIG. 7 is a circuit diagram illustrating conventional option detecting/driving circuit.

Another embodiment of the present invention will be described below referring to FIG. 6. In the case where a light emitting diode (LED) 25 serving as a power indicator is provided in an option unit 19A an option detecting/ driving circuit 4A may be configured as follows.

A reference voltage terminal EA is connected to both the collector of a transistor Tr3 through a resistor R5 and the base of the same transistor through a resistor R6. The emitter of the transistor Tr3 is grounded. The collector of the transistor Tr3 is further connected to a port P3 of an I/O port 7A provided in a CPU 8A of a controller CA. The base thereof is connected to a terminal 12A of a connector 11A through a power line 15A. The emitter thereof is connected to a terminal 14A of the connector 11A through a ground line 17A. A resistor R7 is connected between the power line 15A and ground line 17A. It should be noted that the resistance value of the resistor R7 is sufficiently larger than that of the resistor R6.

In the option unit 19A, a terminal 21A of a connector 20A provided in association with the terminal 12A in the side of the typewriter 1A is connected to the anode of the LED 25. A terminal 23A of the connector 20A provided in association with the terminal 23A in the side o±the typewriter 1A is connected to the cathode of the LED 25.

Under the condition where the option unit 19A has been disconnected from the typewriter 1A, the voltage developed across the resistor R7 permits the base current of the transistor Tr3 to flow to therebY render this transistor conductive. Accordingly, the port P3 is applied with a low-level signal, not the reference voltage or a high-level signal.

On the other hand, under the condition where the option unit 19A has been coupled to the typewriter IA, a current from the power line 15A flows through the terminals 12A and 21A, LED 25, and terminals 23A and 14A to the ground line 17A, thereby turning on the LED 25. At this time, since a relativelY small voltage is developed across the LED 25, the resistor R7 connected in parallel to the LED 25 is brought to the same voltage as that developed across the LED 25. As a result, the transistor Tr3 is not rendered conductive and the port P3 is applied with the reference voltage or the high-level signal.

Therefore, it is unnecessary to provide an option unit detecting signal line, thereby capable of reducing the cost for that connection cable line and suppressing a noise caused by an electric wave radiated from the connection It would be apparent from the foregoing description that the present invention is applicable to the detection of coupling of any kinds of option units, such as a printer or a floppy disk drive, to every type of electronic equipments other than a personal computer.

Although the present invention has been described with reference to specific embodiments, it would be apparent for a person skilled in the art that a variety of changes and modifications may be made without departing from the scope and spirit of the invention.

What is claimed is:

1. An option unit detecting apparatus for detecting a connection of an option unit to an electronic equipment, the option unit being connectable to or disconnectable from the electronic equipment wherein when the option unit is connected thereto, a current is flowed in the optional unit from the electronic equipment and when the option unit is disconnected therefrom, the current flow is interrupted, the electronic equipment including an electronic circuit having an input/output port, the option unit having at least one semiconductor device, said apparatus comprising:

a reference voltage source for supplying a reference voltage, said reference voltage source being coupled to said input/output port for applying a reference voltage thereto;

a switching means having an input terminal and an output terminal coupled to said reference voltage source, said switching means being selectively enabled in response to an enabling signal applied to said input terminal or disabled in response to a disabling signal applied to said input terminal, wherein said reference voltage is applied to said input/output port when said switching means is disabled and application of said reference voltage to said input/output port is interrupted when said switching means is enabled; and a driving means coupled to said switching means for applying said enabling signal to said input terminal when said current flow is interrupted and said disabling signal to said input terminal when said current is flowed in said semiconductor device, whereby whether or not said option unit is connected to said electronic equipment can be detected depending upon whether or not said reference voltage is applied to said input/output port.

2. An option unit detecting apparatus according to claim 1, wherein said input/output port serves as an input port for applying with said reference voltage and as an output port for outputting said current to said semiconductor device.

3. An option unit detecting apparatus according to claim 1, wherein said switching means comprises a transistor having a base as said input terminal, an emitter connected to ground, and a collector as said output terminal.

4. An option unit detecting apparatus according to claim 1, wherein said input/output port includes an input port coupled to both said reference voltage source and said output terminal of said switching means and an output port coupled to said semiconductor device when said option unit is connected to said electronic equipment.

5. An option unit detecting apparatus according to claim 1, wherein said electronic circuit comprises a central processing unit, a read-only memory coupled to said central processing unit, and a random access memory coupled to said central processing unit, said central processing unit having said input/output port.

* * * * *